United States Patent
McFarland

(10) Patent No.: US 6,807,146 B1
(45) Date of Patent: Oct. 19, 2004

(54) PROTOCOLS FOR SCALABLE COMMUNICATION SYSTEM USING OVERLAND SIGNALS AND MULTI-CARRIER FREQUENCY COMMUNICATION

(75) Inventor: William McFarland, Los Altos, CA (US)

(73) Assignee: Atheros Communications, Inc., Sunnyvale, CA (US)

( * ) Notice: Subject to any disclaimer, the term of this patent is extended or adjusted under 35 U.S.C. 154(b) by 0 days.

(21) Appl. No.: 09/553,692

(22) Filed: Apr. 21, 2000

(51) Int. Cl.[7] .............................................. H04J 11/00
(52) U.S. Cl. ........................ 370/208; 370/347; 370/445
(58) Field of Search ................................ 370/203–210, 370/445–449, 335, 342, 329, 332, 319–322, 328, 337, 341, 344, 345–350, 338; 455/450–452.2, 509, 518, 519

(56) References Cited

U.S. PATENT DOCUMENTS

| | | | |
|---|---|---|---|
| 4,661,952 A | * | 4/1987 | von Sichart et al. ........ 370/460 |
| 4,866,710 A | | 9/1989 | Schaeffer |
| 5,123,029 A | | 6/1992 | Bantz et al. |
| 5,142,690 A | | 8/1992 | McMullan, Jr. et al. |
| 5,261,118 A | | 11/1993 | Vanderspool, II et al. . 455/51.2 |
| 5,268,933 A | | 12/1993 | Averbuch ................... 375/107 |
| 5,287,384 A | | 2/1994 | Avery et al. |
| 5,311,550 A | | 5/1994 | Fouche et al. |
| 5,357,513 A | | 10/1994 | Kay et al. |
| 5,384,777 A | | 1/1995 | Ahmadi et al. |
| 5,422,887 A | | 6/1995 | Diepstraten et al. |
| 5,499,236 A | | 3/1996 | Giallorenzi et al. .......... 370/18 |
| 5,506,867 A | | 4/1996 | Kotzin et al. ................ 375/220 |
| 5,561,701 A | | 10/1996 | Ichikawa ..................... 379/57 |
| 5,594,731 A | | 1/1997 | Reissner |
| 5,644,576 A | | 7/1997 | Bauchot et al. |
| 5,657,317 A | | 8/1997 | Mahany et al. |
| 5,768,683 A | | 6/1998 | Mulford |
| 5,802,044 A | | 9/1998 | Baum et al. ................. 370/330 |
| 5,870,427 A | | 2/1999 | Tiedemann, Jr. et al. ... 375/216 |
| 5,870,523 A | | 2/1999 | Kikuchi et al. |
| 5,912,921 A | * | 6/1999 | Warren et al. ............... 370/332 |
| 5,920,557 A | | 7/1999 | Hirata ......................... 370/350 |
| 5,987,011 A | | 11/1999 | Toh |
| 6,275,518 B1 | | 8/2001 | Takahashi et al. ........... 375/135 |
| 6,510,133 B1 | * | 1/2003 | Uesugi ........................ 370/208 |
| 6,545,997 B1 | * | 4/2003 | Böhnke et al. .............. 370/203 |
| 6,587,453 B1 | * | 7/2003 | Romans et al. ............. 370/347 |
| 2003/0123414 A1 | * | 7/2003 | Tong et al. .................. 370/337 |

FOREIGN PATENT DOCUMENTS

| | | |
|---|---|---|
| GB | 2 277 232 | 10/1994 |
| WO | WO 99/49587 | 9/1999 |

OTHER PUBLICATIONS

Meyr et al., *Digital Communication Receivers*, Chapter 5: "Synthesis of Synchronization Algorithms" (John Wiley and Sons, 1998, New York).

(List continued on next page.)

*Primary Examiner*—Steven Nguyen
(74) *Attorney, Agent, or Firm*—Pillsbury Winthrop LLP

(57) ABSTRACT

A communication system such as an OFDM or DMT system has nodes which are allowed to transmit continuously on one or just a few of the system's frequency sub-channels, while the other nodes avoid putting any signal into those sub-channels. Simple low data rate nodes are allowed to use a small number of sub-channels while more complicated nodes use the remainder. A control protocol allows the sharing in time of communications using overlaid and non-overlaid multi-carrier communication techniques. The sharing in time can be done using TDMA, CSMA or polling techniques. In each case, mechanisms are provided for bringing new nodes into the network and for insuring the time alignment of overlaid transmissions. Reliable transmissions are insured through acknowledgement and retransmission facilities.

3 Claims, 8 Drawing Sheets

OTHER PUBLICATIONS

Meyr et al., *Digital Communication Receivers*, Chaprter 10: "DSP System Implementation" (John Wiley and Sons, 1998, New York).

Mueller et al., "Timing recovery in digital synchronous data receivers" (*IEEE Trans. Communications*, vol. COM–24, pp. 516–531, May 1976).

Sklar, *Digital Communications: Fundamentals and Applications*, Chapter 8: "Synchronization in the Context of Digital Communications" (Prentice Hall, 1988, New Jersey).

Verdu, *Multiuser Detection*, Chapter 6: "Nondecorrelating Linear Multiuser Detection" (Cambridge University Press, 1998).

Verdu, *Multiuser Detection*, Chapter 7: "Decision–Driven Multiuser Detectors" (Cambridge University Press, 1998).

Honig et al., "Blind Adaptive Multiuser Detection" (*IEEE Trans. on Information Theory*, pp. 944–961, vol. 41, No. 4, Jul. 1995).

Le Floch et al., "Coded Orthogonal Frequency Division Multiplex" (*IEEE Proceedings*, pp. 982–996, vol. 83, No. 6, Jun. 1995).

IEEE, "802.11, 1997 Edition—Wireless Medium Access Control (MAC) and Physical (PHY) Specifications".

* cited by examiner

PROTOCOLS FOR SCALABLE COMMUNICATION SYSTEM USING OVERLAND SIGNALS AND MULTI-CARRIER FREQUENCY COMMUNICATION

BACKGROUND OF THE INVENTION

1. Field of the Invention

The present invention is directed to communication systems and networks and is particularly directed to such systems and networks which use multi-carrier protocols such as orthogonal frequency division multiplexing and discrete multi-tone protocols, and to techniques for communicating thereover.

2. Background of the Related Art

Orthogonal frequency division multiplexing (OFDM) and discrete multi-tone (DMT) are two closely related formats which have become popular as communication protocols. Systems of this type take a relatively wide bandwidth communication channel and break it into many smaller frequency sub-channels. The narrower sub-channels are then used simultaneously to transmit data at a high rate. These techniques have advantages when the communication channel has multi-path or narrow band interference.

The following discussion of the prior art and the invention will address OFDM systems; however, it will be understood that the invention is equally applicable to DMT systems (as well as other types of communication systems) with only minor modifications that will be readily apparent to those skilled in the art.

A functional block diagram of a typical OFDM transmitter is shown in FIG. 1. Here, an incoming stream 10 of N symbols $d_0, d_1 \ldots d_{N-1}$ is mapped by a serial-to-parallel converter 20 over N parallel lines 30, each line corresponding to a particular subcarrier within the overall OFDM channel. An Inverse Fast Fourier Transform circuit 40 accepts these as frequency domain components and generates a set 50 of time domain subcarriers corresponding thereto. These are converted by a parallel-to-serial converter 60. Due to the characteristics of the inverse Fourier transform, although the frequency spectra of the subcarrier channels overlap, each subcarrier is orthogonal to the others. Thus, the frequency at which each subcarrier in the received signal is evaluated is one at which the contribution from all other signals is zero.

A functional block diagram of the corresponding OFDM receiver is shown in FIG. 2. Here, an OFDM signal is received and converted into multiple time domain signals 210 by a serial-to-parallel converter 220. These signals are processed by a Fast Fourier Transform processor 230 before being multiplexed by parallel-to-serial converter 240 to recover the original data stream 250.

Systems such as OFDM and DMT systems either do not share the main channel with other users at all (e.g., when they are implemented using a telephone modem), or share the channel in time (e.g., when implemented in TDMA and CSMA schemes); thus, their flexibility and ease of use is limited. Sharing the channel in time (i.e., allowing only one user to transmit at a time) has two serious disadvantages. First, to maintain high throughput, all nodes sharing the channel must operate at a high data rate, and therefore be equally complex; thus, no less-complicated processing circuitry which might otherwise be used with low data rate channels can be employed. Second, a user who actually desires a low data rate must send data as very short high speed bursts over the network. In order to overcome propagation loss in the path, such a node must transmit at a high peak power because the transmit power is proportional to the peak data rate. Again, economies inherent in the low data rate processing cannot be exploited.

As a practical example, the IEEE 802.11a communication standard specifies transmission with 52 sub-channel frequencies. This requires substantial signal processing; a high transmit power while active to achieve significant range; a large peak-to-average ratio while actively transmitting; high resolution ADCs and DACs; and very linear transmit and receive chains. While such complicated hardware allows transmission up to 50 Mb/s, this level of performance is overkill for something like a cordless phone, which only requires roughly a 32 kb/s transmission rate.

In connection with the peak-to-average ratio, note that for 52 sub-channels, while transmitting the peak-to-average ratio of the signal is $52^2/52=52$ in power. Therefore, to avoid distortion of the signal, the power amplifier must be substantial enough to provide far more instantaneous power than is required on average. Since the peak-to-average ratio is directly proportional to the number of sub-channels, building a lower capacity unit that uses fewer carriers can substantially decrease the costs of such a device.

In an effort to solve the above shortcomings of the prior art, a system has been proposed which implements frequency communication but allows channel sharing between users in a way that would allow simple nodes such as a 32 kb/s cordless phone to transmit continuously at a low rate while other high speed nodes such as 20 Mb/s video streams communicate at a much higher data rate simultaneously. This can be an OFDM or DMT system in which the simple nodes are allowed to transmit continuously on one or just a few of the frequency sub-channels, while the other nodes avoid putting any signal into those sub-channels.

A system such as the one described above advantageously allows individual carriers to be used by different devices in a multi-carrier communication network such as an OFDM network to allow the simultaneous communication of high data rate devices which use many carriers and low data rate devices which use only one or a few carriers. Devices that use one or a few carriers can be lower in cost and power consumption than their counterparts which use many carriers due to the reduced digital complexity, reduced analog accuracy, reduced required transmit power and reduced peak-to-average power ratios of their communication sections. By allowing the low data rate and high data rate nodes to communicate at the same time, the overall throughput of the network remains high.

There are a number of constraints imposed on the physical layer of almost any communication network in which low-cost implementation and support for multimedia applications are desired. For example, it is more inconvenient, difficult, expensive and time-consuming to construct such communication systems that can simultaneously transmit and receive, particularly in wireless domains. Therefore, it is best to coordinate nodes in communication networks so that no node is required to simultaneously transmit and receive, i.e., to implement half duplex operation.

Further, because of the great attenuation, multi-path propagation and variability of certain communication media such as radio channels, signals transmitted therethrough must live with high error rates. This frequently causes data packets to contain errors. It is important for the device to somehow signal if a packet arrived with an error so that the transmitting node can resend the packet. Also, multimedia traffic requires low latency and low jitter in the arrival of packets. Interactive traffic such as telephony and video telephony are sensitive to both latency and jitter. Streaming applications such as CD-quality audio and digital video are primarily sensitive to the jitter in the time of arrival of subsequent packets of information. Guaranteeing the quality of service by insuring regular access to the medium and preventing collisions is the main goal of the protocol.

In addition to physical layer constraints common to low-cost, multimedia-capable communication systems, there are a number of constraints imposed on the physical layer of the network in order to support overlaid multi-carrier operation. For example, nodes in such overlaid multi-carrier systems preferably precompensate their transmit frequencies. This is because the close carrier spacings used in multi-carrier modulation make it difficult to insure that a given node will transmit its carriers with sufficient frequency accuracy to ensure that adjacent carriers do not bleed over into one another. If frequencies are sufficiently off, two nodes may actually end up transmitting their signals at the same frequency. Ensuring sufficient accuracy by using extremely accurate frequency references is in most cases prohibitively expensive. Instead, the nodes should preferably compensate for the inaccuracy of their transmitting frequency before transmitting.

Systems have been proposed which do this by, e.g., locking the frequency used by each node to a highly accurate external reference such as a Global Positioning System (GPS) satellite; locking the frequency used by each node to the transmit frequency of the base station; or adjusting the frequency used by each node according to closed-loop feedback signals sent by the base station.

Another physical layer constraint in overlaid multi-carrier systems is that nodes should adjust their transmissions in time so that when the signals from different nodes arrive at a receiver, the symbol transitions in the signal streams are aligned in time within a small fraction of the total symbol time. This is once again due to the close orthogonal spacing of the carriers in OFDM and DMT systems. The signals are not orthogonal during the portion of the symbols in which the symbols are making transitions. Therefore, separating the signals from different nodes on different carriers becomes difficult if some of the signals are making symbol transitions while others are stationary. Systems have been proposed which address this constraint by, e.g., adjusting the transmission of packets at the nodes according to a highly accurate external time reference such as the GPS satellite mentioned above; adjusting the transmission of packets at the nodes according to closed-loop feedback signals sent by the base station; or simply relying on the nodes' close proximity or nearly equal distance to the base station to ensure there is not a significant amount of delay in their transmitted signals.

Further, overlaid multi-carrier OFDM and DMT systems theoretically use perfectly orthogonal carriers; however, in practice some crosstalk between carriers is present. This may be due to distortion in the analog domain, limited resolution in the digital domain, or frequency inaccuracies. Because the carriers will not be perfectly orthogonal, it is important that carriers from different nodes arrive at the receiver with similar power levels. Too great a power difference, coupled with imperfect orthogonality, will make it impossible to separate the signals. A system has been proposed which addresses this constraint by implementing a closed-loop power control scheme in which the strength of each signal is adjusted at the node according to feedback signals sent to it by the base station, or by implementing an open-loop power control scheme in which the strength of each signal is adjusted at the node according to the power level of the base station signal it receives.

The above constraints on overlaid multi-carrier systems favor a communication system where in one period of time multiple nodes transmit to a base station, and during another period of time the base station transits to the multiple nodes. It is difficult to meet time alignment and power control at all nodes simultaneously if multiple peer-to-peer style communications are allowed at once.

Existing communication protocols do not provide for the use of carriers within a multi-carrier communication system such as an OFDM or DMT system. In addition, existing communication protocols do not respect the constraints listed above. While all of these constraints are not hard and fast, protocols that do not respect these constraints result in communication systems that are more expensive, less efficient, less robust or give poorer quality service.

SUMMARY OF THE INVENTION

In view of the above problems of the prior art, an object of the present invention is to provide an overlaid, multi-carrier communication system which implements effective self-adjustment of its operating frequencies.

It is another object of the present invention to provide an overlaid, multi-carrier communication system which implements effective self-control of its communication timings.

It is a further object of the present invention to provide an overlaid, multi-carrier communication system which implements effective power control of individual carrier transmit powers.

It is still another object of the present invention to provide an overlaid, multi-carrier communication system in which no node is required to simultaneously transmit and receive.

It is an even further object of the present invention to provide an overlaid, multi-carrier communication system which provides an effective acknowledgement and retransmission mechanism for communicated packets.

It is yet another object of the present invention to provide an overlaid, multi-carrier communication system which exhibits low latency and jitter in the arrival of packets.

The above objets are achieved according to one aspect of the present invention by providing an overlaid multi-carrier communication system which is able to assign carriers and time slots to meet the communication requirements of each node with few or no collisions. Simple low data rate nodes are allowed to use a small number of sub-carriers while more complicated nodes use the remainder, and preferably functionality is provided to ensure that adjacent sub-channels are reliably spaced apart in frequency so that they do not bleed over into one another; to ensure that signals from all nodes arrive at the base station with well-aligned symbol transitions; and to ensure that signals from the various nodes arrive at the base station with similar power levels.

BRIEF DESCRIPTION OF THE DRAWINGS

These and other objects, features, and advantages of the present invention are better understood by reading the following detailed description of the preferred embodiments, taken in conjunction with the accompanying drawings, in which.

DETAILED DESCRIPTION OF PRESENTLY PREFERRED EXEMPLARY EMBODIMENTS

Figure 1:
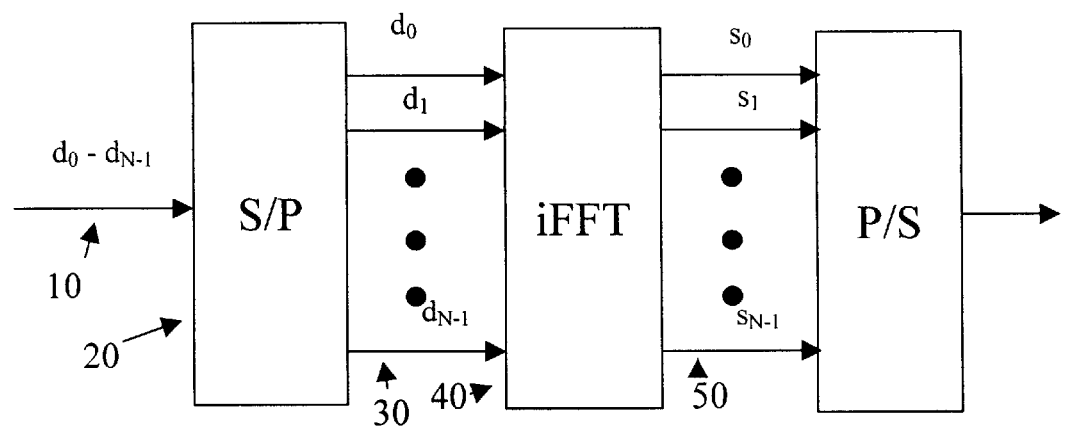
FIG. 1 is a block diagram of an OFDM transmitter according to the prior art.
Figure 2:
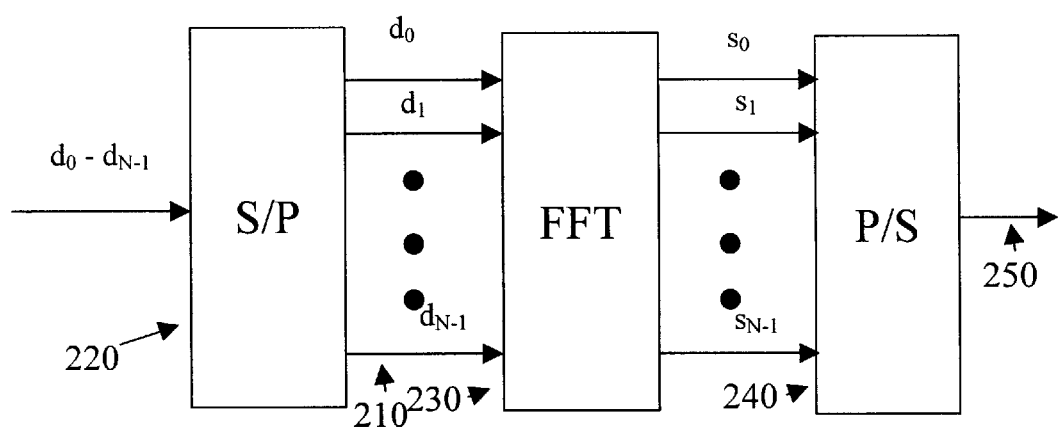
FIG. 2 is a functional block diagram of an OFDM receiver according to the prior art.
Figure 3:
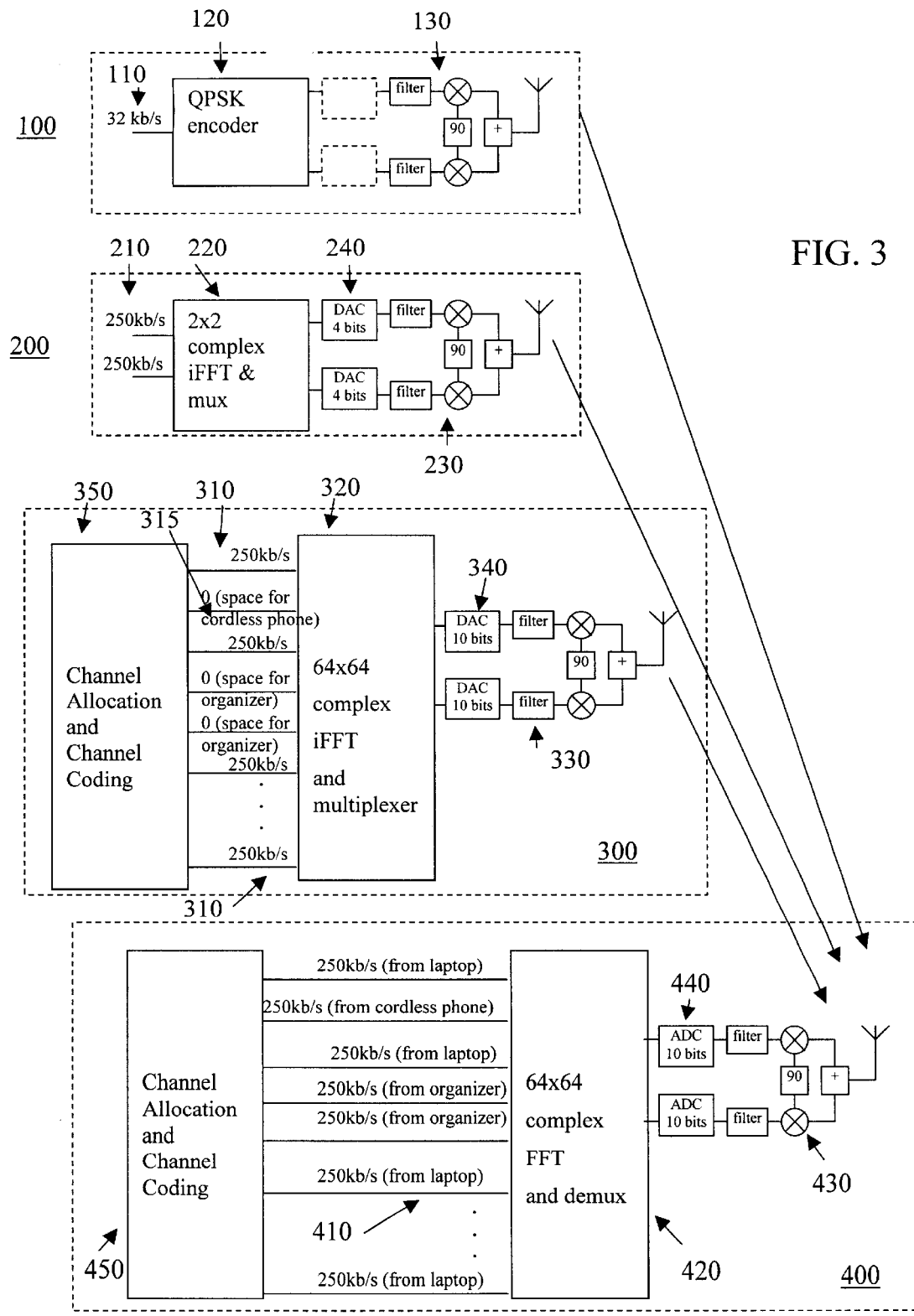
FIG. 3 is a diagram of overlaid node transmission.

FIG. 3 shows a diagram in which a cordless phone 100, an organizer 200, and a laptop computer 300 are simultaneously communicating with a base station 400. Here, the cordless phone 100 receives or generates a data stream 110 representative of, e.g., 32 kb/s audio information. This data is encoded by a relatively simple quadrature phase shift keying (QPSK) encoder 120 and processed by filtering and modulation circuitry 130 as is known in the art. Due to the low data rate of the phone 100, the QPSK encoder 120 can be used in place of a more complicated IFFT processor as is conventionally used in OFDM systems. Further, use of the QPSK encoder 120 permits elimination of the digital to analog converters (DACs) normally used to render the IFFT product in an analog form suitable for filtering and transmission.

The organizer 200, on the other hand, is a device requiring a moderate data communication rate and, although it requires more complicated circuitry than the cordless phone 100, can still make use of simpler hardware than prior art OFDM nodes. Specifically, the organizer receives a few, e.g., two, 250 kb/s data streams 210 and processes them through a 2×2 complex IFFT processor and parallel-to-serial converter 220 (performing the IFFT transform and multiplexing). The processed signals are then converted into analog form by a pair of 4-bit digital-to-analog converters 240 (relatively low resolution DACs may be used due to the need to process only a small number of sub-channels) and then filtered and transmitted by circuitry 230 as known in the art.

The laptop 300 is typically the most complicated device of the three and therefore has the highest data rate requirements. It receives a set of, e.g., 61 250 kb/s data streams 310 (as well as three zeroed streams 315 to hold the place for the channels of the other two devices) and processes them in a 64×64 complex IFFT processor and parallel-to-serial converter 320. Similar to the organizer 200, the result is converted into analog form by dual DACs 340 (note that DACs having 10-bit resolution are required in the laptop 300) and filtered and transmitted in circuitry 330 as is known in the art.

Transmissions from each of the nodes are received by a base station 400, processed by demodulation and filtering circuitry 430, and converted into digital form by dual 10-bit analog-to-digital converters 440 as known in the art. The result is demultiplexed and processed in a fast Fourier transform processor 420 before being output to subsequent circuitry as a set of data streams 410. Depending on the application, the data streams 410 can be further processed as will be readily apparent to those skilled in the art. Further, the data streams 410 can be used by a channel allocation and coding unit 450 which monitors reception quality, bit errors rates and the like of the data streams 410 for use in making channel allocation and coding decisions as will be described in greater detail below. When the unit 450 determines that nodes should change channels, it issues the appropriate command as a data packet which is included in the transmission of base station 400.

As can be seen above, this system permits multiple node devices 100–300 of varying levels of complexity to communicate with a base station 400 over a single OFDM system by allowing the simpler devices 100 and 200 to communicate on a few sub-channels 315 within the OFDM channel, and ensuring that these do not interfere with the most complex device 300 using most of the sub-channels 310 by preventing device 300 from using these sub-channels 315 (in this case, by zeroing those sub-channels 315 at the FFT 420 in the main device 300; however, other equivalent methods can of course be used). Further, the sub-channels 315 may be predetermined, or the simpler nodes 100 and 200 can communicate on any subset of channels by changing the tuning of their up-converting synthesizers, or by doing a numerical frequency offsetting in the digital domain, although a digital-to-analog converter might be needed in that case.

In this way, the circuitry for the simpler nodes, e.g., the cordless phone 100, can be simplified relative to that in the laptop 300 because lower resolution is required in the phone DAC (or no phone DAC at all is required); less digital computation is necessary in the phone 100 due to its lower data communication rate; and a lower peak to average ratio is required in the cordless phone transmitter (since fewer sub-channels are used simultaneously).

Figure 4:
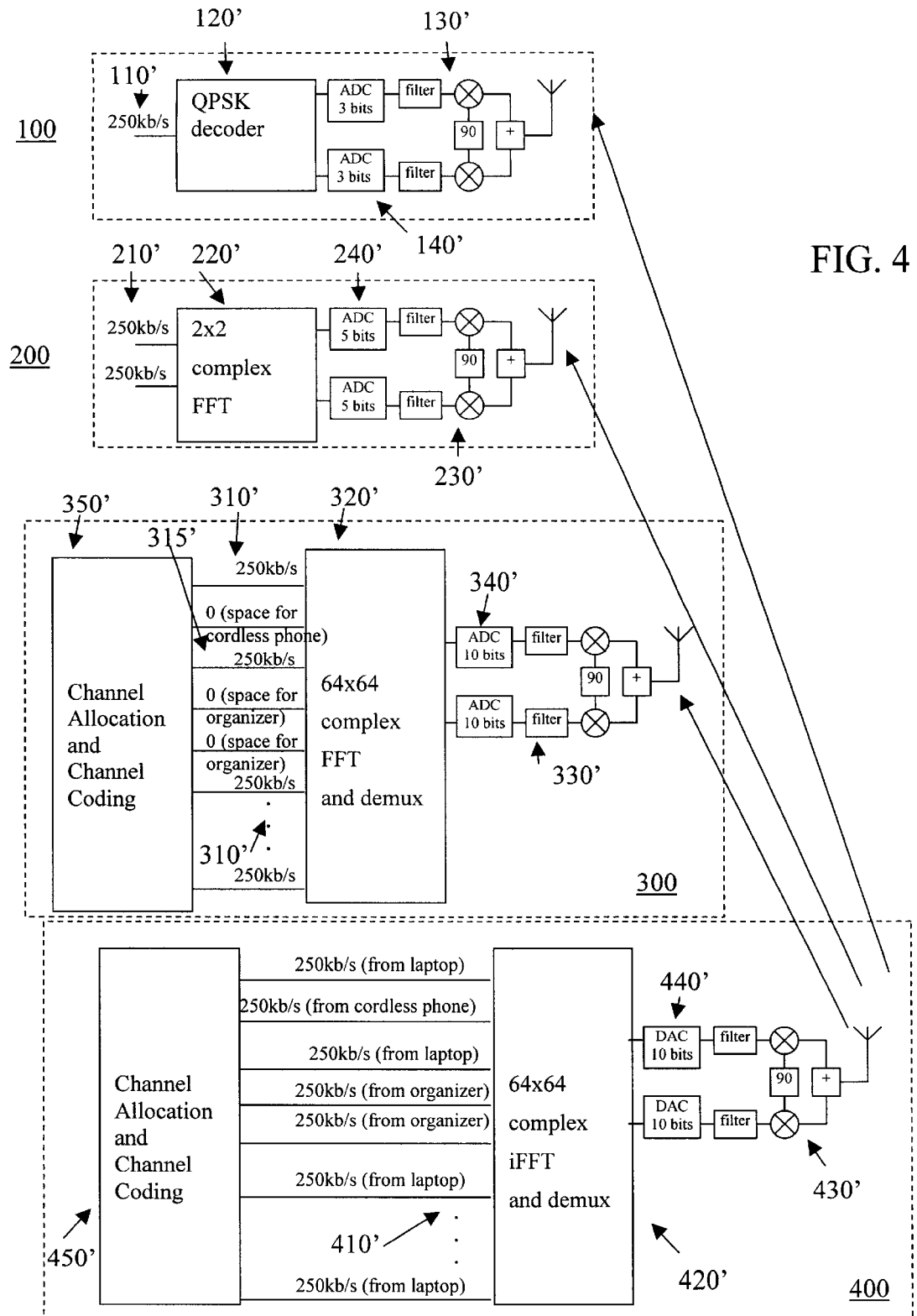
FIG. 4 is a diagram of base station overlaid transmission.

FIG. 4 shows the situation when the base station 400 is transmitting and the other nodes 100–300 are receiving.

Here, components within each node 100–300 and the base station 400 relevant to this operation are illustrated. That is, the base station 400 receives a set of data streams 410' to be variously transmitted to the cordless phone 100, organizer 200 and laptop 300 and processes them in a 64×64 complex iFFT processor and multiplexer 420' to produce dual digital data streams which are converted into analog form by a pair of digital-to-analog converters 440' and then filtered and transmitted by circuitry 430' as is known in the art.

Transmissions from base station 400 are received by cordless phone 100 by receiving circuitry 130' and converted to digital form by dual three-bit analog-to-digital converters 140' (although corresponding DACs were omitted in the transmitting node of FIG. 3, ADCs are preferably used in the receiving node due to noise in the received base station signal). The output of the analog-to-digital converters 140' is sent to a QPSK decoder 120' which outputs a 32 kb/s data stream correspond to its counterpart in the base station data stream set 410'.

In organizer 200, transmissions from the base station 400 are received, processed by receiving circuitry 230' and supplied to a pair of five-bit analog-to-digital converters 240' (similar to the node 100, five-bit ADCs are preferably used here rather than the four-bit DACs in the version of FIG. 3 due to noise in the received base station signal). The converters' output is supplied to a 2×2 complex FFT and demultiplexer 220' which generates two 250 kb/s data streams 210' corresponding to their counterparts in the base station data stream set 410'.

Finally, the laptop 300 receives base station transmissions and processes them with receiving circuitry 330'. The results are converted into digital form by dual analog-to-digital converters 340' and applied to a 64×64 complex FFT and demultiplexer 320' which outputs the 61 data streams 310' corresponding to the laptop channels in base station data stream set 410', while leaving the streams corresponding to the cordless phone 100 and organizer 200 at zero.

Channel allocation and coding unit 350' in the laptop 300 monitors the data streams 310' for bit errors, lost packets and the like much like its counterpart 450 in the base station 400; however, rather than unilaterally making channel allocation changes to improve communication like the unit 450, the unit 350' can cause the laptop 300 to send requests to the base station 400 to change or reallocate channels. Depending on constraints imposed by other nodes, the base station 400 may or may not accept the recommendation and transmit the appropriate command.

Thus, the cordless phone 100 (and, to a lesser degree, the organizer 200) is much simpler than a full blown DMT/OFDM unit as represented by the laptop 300. The cordless phone 100 has less resolution required in its ADC 140' (and no DAC is required); less digital computation conducted in its QPSK encoder 120 and decoder 120' compared to the iFFT processor and multiplexer 320 used in the laptop 300; and lower linearity requirements in the receive chain.

The assignment of sub-channels to various users can be simple, or can be quite sophisticated to optimize performance of the complete system. For example a node may use a single or small subset of sub-channels as shown by nodes a and b in FIG. 5, which respectively occupy sub-channels 2 and 5 in a hypothetical nine-channel system.

Figure 5:
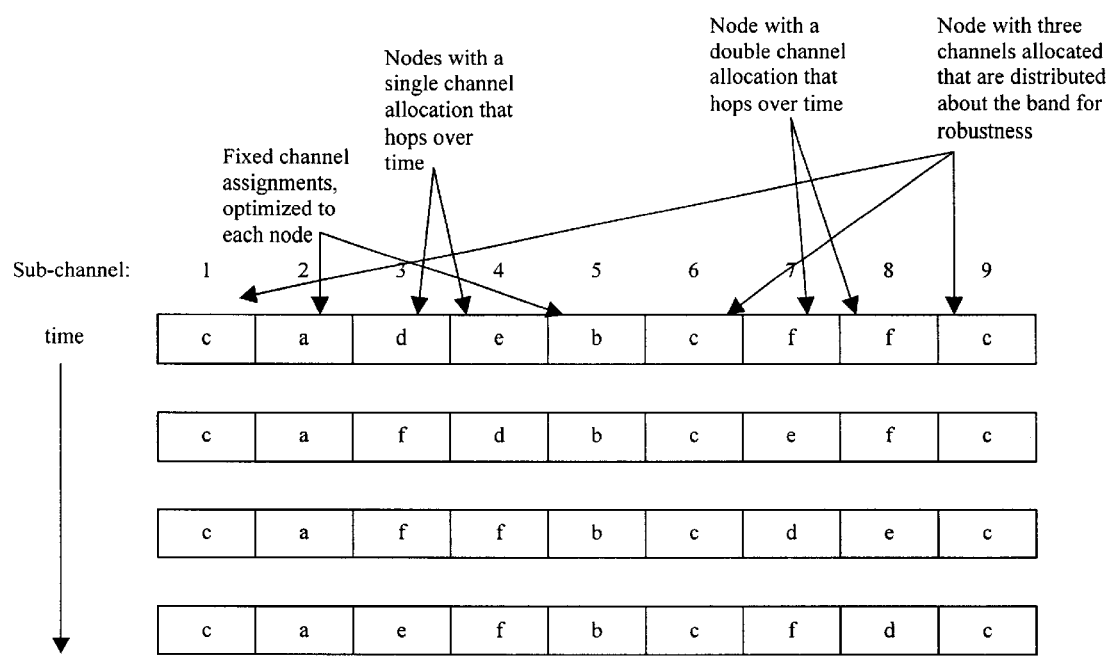
FIG. 5 is a diagram of overlaid channel switching techniques.

Such an arrangement might run into problems from interference, or the cancellation of a small range of frequencies due to multi-path propagation effects (narrow fading) which are detected by the channel allocation and channel coding section 450 by monitoring the quality of the data streams 410. To prevent this, the subset of channels assigned to this node might be spaced out across the entire range of sub-channels available within the band. For example, four of 48 sub-channels might be used, spaced evenly across the band by using sub-channels 1, 13, 25, and 37. Thus narrow band interference or fading might eliminate one of the four sub-channels within the signal, but the other three would remain. Given sufficient coding to overcome the loss of one of the four sub-channels, the message would get through. This technique is illustrated in FIG. 5, in which node c uses sub-channels 1, 6 and 9.

Another way to provide similar robustness would be to "hop" the sub-channels in use over time. This approach would work even for the case in which only one sub-channel is used at a time. For example, the node could transmit on sub-channel 1 in the first time period, then switch to channel 13 in the next period. Packets lost when the node is on a frequency that has interference or fading could be retransmitted after the next "hop". Several such hopping nodes could be supported at the same time, hopping between the same set of sub-channels in a sequential basis. In FIG. 5, this technique is illustrated by nodes d and e in FIG. 5—node d sequentially uses sub-channels 3, 4, 7 and 8, while node e consecutively uses sub-channels 4, 7, 8 and 3.

A similar arrangement could be used for nodes that use multiple sub-channels simultaneously, hopping them all in contiguous blocks, or spreading them out as described above and hopping the entire spread of sub-channels from one channel set to another over time. This is illustrated in FIG. 5 by channel f, which sequentially uses sub-channels 7 and 8, then sub-channels 3 and 8, then sub-channels 3 and 4, and finally sub-channels 4 and 7.

Even more sophisticated methods could be applied. Narrow band fading and interference are likely to affect different nodes within a network differently due to the various nodes' locations. Thus a given sub-channel may work poorly for some of the nodes, but it might work well for other nodes. The sub-channels could therefore be intelligently allocated, swapping the assignments between nodes until all nodes are satisfied.

Other adjustments might be made to accommodate the needs of individual nodes in the network. For example, nodes that are a long distance from the base station or other nodes in the network might be allocated more channels for a given required data rate. Generally, it is easier to send a given data rate in a wider bandwidth than to fit the same data rate into a narrow bandwidth. For example, a node at the edge of range might be given four sub-channels instead of just one so that it can transmit using a QPSK (4-QAM constellation) rather than a 64-QAM constellation. This would significantly reduce the required signal to noise ratio to get the message through, thereby increasing the range to this node.

Similarly, the total transmit power emanating from a base station could be allocated unequally among the sub-channels, allowing more power to be spent on the nodes which are farther away, or nodes that are trying to fit a large amount of data through a narrow sub-channel. Additionally, similar to the nodes which provide zero magnitude data for sub-channels which are in use by other nodes to avoid transmitting signals on the corresponding frequencies, the base station may use zero magnitude data for sub-channels which are not used by any node, thereby saving power and reducing the base station transmitter's peak-to-average ratio.

Figure 6:
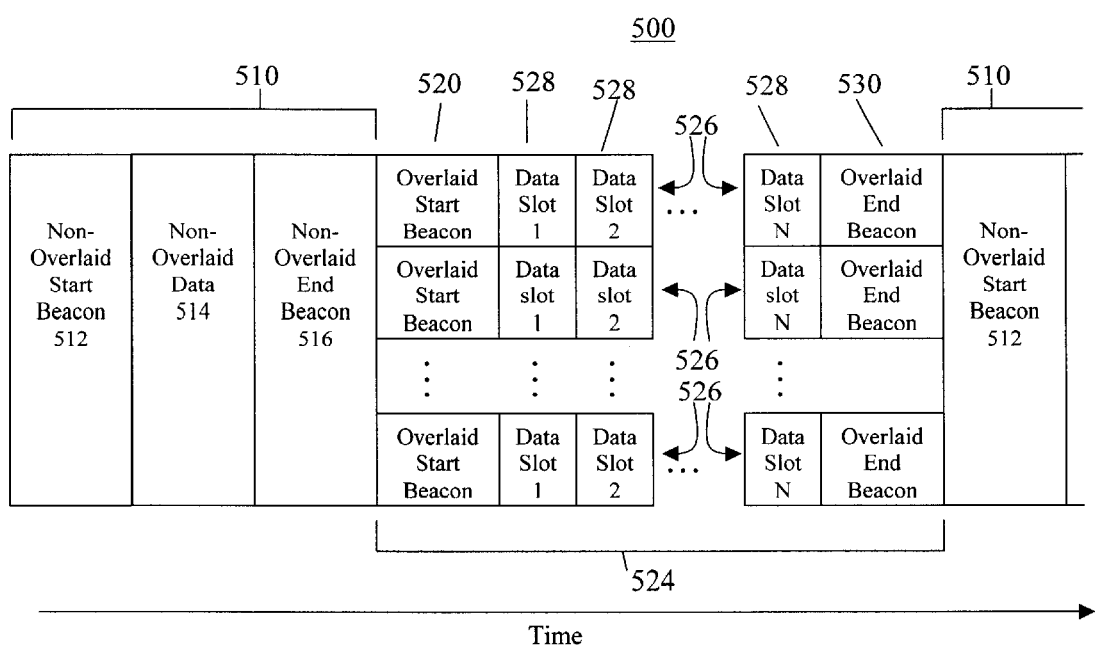
FIG. 6 is a timing chart of a frame protocol according to a preferred embodiment of the present invention.

This overlaid communication system described above may be used independently as described above, or in a preferred embodiment of the present invention it is part of an integrated overlaid/non-overlaid "super frame" communication system. FIG. 6 charts a communication segment 500 in this embodiment which is preferably implemented using a microprocessor or similar controller in each communicating unit and begins with a non-overlaid communication period 510 commencing with a non-overlaid communication start beacon 512. This is an information segment signaled by a coordinator node (a base station 400, a node that has been elected or volunteered to perform system coordination functions, or a number of nodes among which the coordination function is handed in an ad hoc network where there is no established infrastructure such as an established base station) over all available carriers; alternatively, for robustness and distributed ad hoc operation the duty of sending the non-overlaid start beacon 512 may be shared amongst the nodes. In this case there would not be one fixed permanent coordinator, but each of the nodes would act as coordinator on a temporary basis.

Preferably, the segment 512 includes a header pattern which allows all nodes to easily recognize that it is a non-overlaid communication start beacon 512, as well as the length of time non-overlaid communication will be available. The start beacon 512 may additionally carry other information; for example, it may specify when the beginning and end of various communication periods will occur as well as their lengths. The inclusion of such information allows all nodes to stay in synch with the network, even if they cannot interpret the messages during the overlaid communication period 520, or during the non-overlaid communication period 510. Also, since the non-overlaid communication start beacon 512 is broadcast over all available carriers all nodes will receive it, though nodes that can receive only a subset of carriers may not be able to interpret it. This is particularly the case where when the signal is sent on all carriers it is coded across all the carriers, so that if a node cannot receive all carriers it cannot understand the signal. This is characteristic of systems that are backwards-compatible with nodes implementing protocols such as HiperlanII or IEEE 802.11.

The next communication segment in the non-overlaid communication period 510 is the non-overlaid data communication period 514 which supports communication between nodes that can use all carrier frequencies within the multi-carrier communications channel. Since all available carriers are used by a single node during this period, the non-overlaid data communication period 514 cannot support overlaid communication. The non-overlaid data communication period 514 is useful for supporting nodes that are not able to use a subset of the available carriers. Additionally, since only one node is transmitting, the non-overlaid data communication period 514 can be used to support peer-to-peer communication without violating the need for time alignment, power control, and half duplex operation mode. Nodes that can receive only a subset of carriers will neither transmit nor receive during the non-overlaid data communication period 514—based on the overlaid beacons which these nodes can understand, they will know when to transmit and will not transmit outside of the overlaid period.

A non-overlaid communication end beacon 516 complements the start beacon 512 and follows the non-overlaid data communication period 514. Like its counterpart, the end beacon 516 is an information segment signaled by a coordinator node over all available carriers. Preferably, the beacon 516 includes a header pattern which allows all nodes to easily recognize that it is a non-overlaid communication end beacon 516, as well as the length of time before non-overlaid communication will again be available. The end beacon 516 may additionally carry other information as described above in connection with the non-overlaid start beacon 512. Since the non-overlaid communication end beacon 516 is broadcast over all available carriers all nodes will receive it, though nodes that can receive only a subset of carriers will not be able to interpret, it as described in connection with the start beacon.

Usually a node which has no more information to send informs the controller node that they are going to sleep for the next, e.g., one second. After this time is up they wake back up to check to see if there are any messages waiting for them that they should call in and ask for. Whether there are messages waiting for a particular node is usually carried in the beacon which the node wakes up to listen to. This is done to save power, as the node does not need to be running the radio circuitry while it is asleep, e.g., once per second, to listen to a beacon. The non-overlaid communication start and end beacons 512 and 516 preferably additionally contain information that will allow the nodes to go to sleep.

Messages that are intended for a node which is asleep are stored in a buffer at the controller node. The controller node then indicates that messages are waiting for the node in these beacons. As noted above, when the sleeping node wakes up and listens to the beacon, it will learn that there are messages waiting for it. It can then send a message to the controller node indicating that it is now awake and would like the controller to send the messages that were held in the queue. Information in the start and end beacons 512 and 516 can then indicate if that node should stay awake and request delivery of messages that have been queued for it at the coordinator node. If no messages are queued and the node has nothing of its own to transmit, it can go back to sleep. The wake-up frequency may be fixed, or the node and the coordinator node can negotiate how often the node will wake up to check the beacon.

After the non-overlaid communication end beacon 516 comes the overlaid communication period 520. Its beginning is signaled by the overlaid communication start beacon 522 which parallels the non-overlaid communication start beacon 512 in its purpose. The overlaid communication start beacon 522 is transmitted on all available carriers so that even a node that can receive only one channel can recover the start beacon 522, and preferably contains a header which enables nodes to easily recognize it. The overlaid communication start beacon 522 preferably contains assignments of nodes to carrier frequencies as described above and, potentially, time slots for node shifting as described in connection with FIG. 5. The start beacon 522 also preferably specifies the length of the following overlaid data communication period 524, or alternatively the time at which the period 524 will end, as well as other information such as that described above in connection with the non-overlaid communication period 510. Nodes that are not able to handle overlaid communications may not understand this beacon. This is because current systems code the information across all carriers in a particular way. In this case, information is preferably coded serially down each carrier individually.

It is in fact possible to implement nodes which use all available carriers, or a subset of them. They will be able to encode and decode information across all carriers, or serially down each carrier individually. These "super nodes" will be able to operate in both the overlaid and non-overlaid periods, but according to different rules in each period.

As mentioned above, the overlaid data communication period 524 follows the overlaid data communication start beacon 522. It is here that the basic overlaid communication scheme may be implemented. That is, the overlaid data communication period 524 supports overlaid signaling in which more than one node is transmitting at the same time and nodes use fewer than all of the available carrier frequencies. These different carriers are shown in FIG. 6 as different rows 526 in the overlaid data communication period 524. During the overlaid data communication period 524, a given carrier 526 may be assigned to only one node for transmission, as with nodes a and b in FIG. 5. In the present embodiment, this means the node would occupy each data slot 528 for a particular carrier 526. Also, a particular carrier 526 might be shared in time between several nodes including the controller node. Methods for sharing in time while in overlaid communication mode will be described in greater detail below. Nodes that cannot handle overlaid communications would neither transmit nor receive during the overlaid data communication period 524.

The end of the overlaid data communication period 524 is signaled by an overlaid communication end beacon 530. As with its non-overlaid counterpart, this beacon 530 preferably includes an easily-recognizable header and indicates the time at which (or the delay before) the next overlaid communication period 524 begins. It might also carry information similar to that of the overlaid communication start beacon 522 described above. Like the non-overlaid communication end beacon 516, this beacon 530 is preferably transmitted on all available carriers to ensure that even nodes capable of accessing only a single channel will receive it. Nodes that do not know how to handle overlaid communications will not understand this beacon.

The overlaid communication start beacon 522 and overlaid communication end beacon 530 preferably contain nearly the same information described above in connection with their non-overlaid counterpart beacons 512 and 516; however, the overlaid beacons 522 and 530 may contain different information on each carrier frequency 526. Some information such as the time reference and when the overlaid communication period 520 begins and ends needs to be transmitted on each carrier 526; however, other information such as which time slot 528 is assigned to which node for a given carrier 526 is unique to each carrier 526. Information unique to a given node, e.g., sleep/wake information, only needs to be transmitted on one of the carriers 526 assigned to that node. Also, the beacons 522 and 530 may contain information about which carrier/time slot pairs are available for nodes to request service.

One further piece of information that the overlaid communication period beacons 522 and 530 need to carry is the assignment of nodes to frequency carriers 526. Additionally, in the TDMA and CSMA implementations described below it may be important to specify which time slots 528 are for uplink and which are for downlink to ensure that the coordinator node does not need to transmit and receive at the same time.

As shown in FIG. 6, after the overlaid communication period 520 ends, operation preferably continues with a new communication segment 500.

The frame protocol 500 of this embodiment may be readily adapted to work with existing industry standard protocols. For example, the IEEE 802.11 standard specifies a PCF beacon which specifies an amount of time during which nodes are to remain silent as long as they are not requested to transmit by a poll message. This beacon could be used as the overlaid communication start beacon 522. Nodes that do not understand transmissions during the overlaid communication period 520 would remain silent based on the time period specified in the PCF beacon. After the time period 520 is up, these nodes would be free to communicate in their standard non-overlaid mode during the non-overlaid communication period 510.

Further, the IEEE 802.11 standard defines a CF-End beacon. This beacon announces the end of the polling period. It is used if the polling is completed before the time reserved in the PCF beacon period expires. This beacon could serve as the overlaid communication end beacon 530 to indicate that the overlaid communication period 520 has ended, thereby allowing nodes to begin communicating in their traditional non-overlaid manner in the next non-overlaid communication period 510.

Similarly, the frame protocol 500 of this embodiment may be readily adapted to work with the existing HiperlanII industry standard protocol. In this protocol, communication during the non-overlaid period is done by time division multiple access (TDMA). Since the assignment of time slots for transmissions is controlled, it is easy in this communication system to reserve a period of time during which overlaid communication would be supported.

A TDMA scheme can readily be implemented using the communication period 500 described above. TDMA may be implemented in either the overlaid communication period 520 or the non-overlaid communication period 510. The following example will make use of the overlaid communication period 520; however, implementation using the non-overlaid communication period 510 will be readily apparent to those skilled in the art.

TDMA using the overlaid communication period 520 is done quite similarly to the node shifting arrangement described above and illustrated in FIG. 5. That is, a node can be assigned any combination of carrier frequencies 526 and time slots 528 on those carrier frequencies 526. Slots 528 may be of fixed length as described above, or they may be dynamic to adjust for the data requirements of individual nodes. Information on the timing, length and assignment of data slots 528 is preferably contained in the overlaid communication start beacon 522 (and for robustness perhaps in the overlaid communication end beacon 524 as well) and is used by all nodes to coordinate the TDMA process. For a non-overlaid TDMA implementation, the non-overlaid communication start beacon 512 (and possibly the end beacon 516 as well) preferably contains information about the number of time slots, the length of each time slot and which nodes are to use each time slot for uplink or downlink messages. Additionally, the beacons 512 and 516 preferably broadcast the available time slots with which nodes can send a message to request service.

Figure 7:
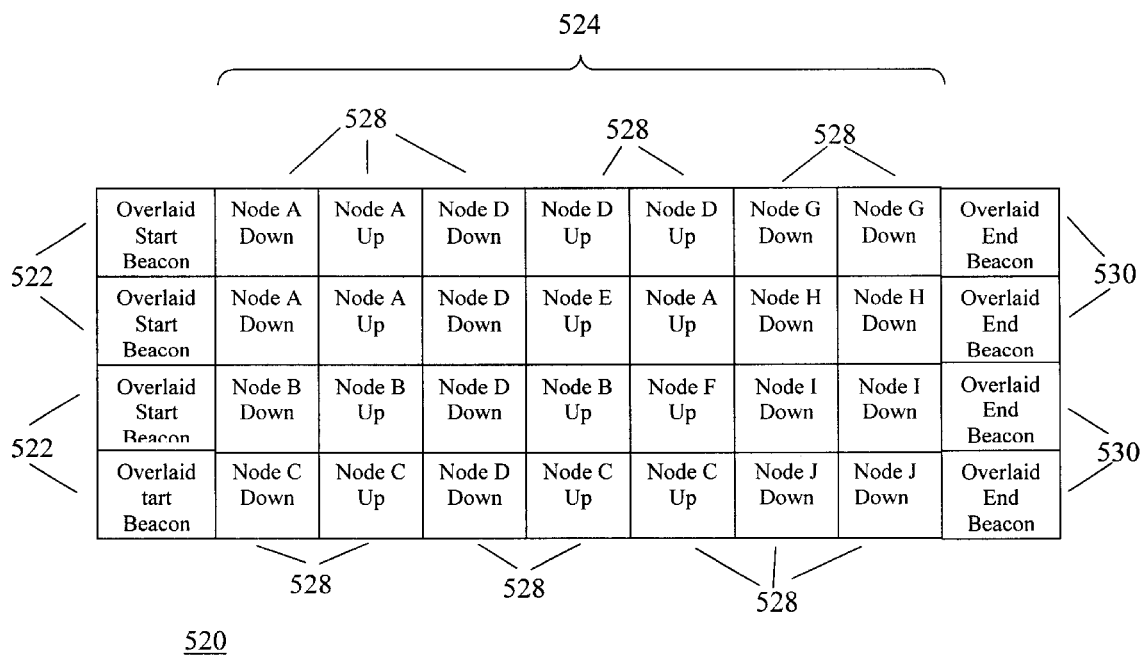
FIG. 7 is a timing chart of TDMA communication according to another preferred embodiment of the present invention.

FIG. 7 shows a preferred embodiment of slot and carrier assignments in a small TDMA system. There, the slots 528 on different carriers have been aligned in time and segmented between downlink slots where the coordinator node transmits and uplink slots where the other nodes transmit. Aligning the slots 528 also aligns the transmissions of overlaid nodes in time. Making sure that all downlink and uplink slots 528 are aligned in time insures that the coordinator node will not need to transmit and receive at the same time and can maintain half duplex operation.

Another technique which can be used to allocate channels amongst the nodes is for each node that wishes to use a carrier to listen on the carrier first to determine if any other node is currently using the channel. This is also known as carrier sense multiple access (CSMA). This technique allows multiple nodes to share a communication channel in time while keeping the number of simultaneous transmissions, i.e., collisions, to a minimum. This technique is also advantageous because, unlike the TDMA scheme above, it is self-organizing and requires no participation from the coordinator node.

As with TDMA; the CSMA technique can be used in an overlaid or non-overlaid communication system. Nodes can contend for use of each carrier frequency independently. Alternatively, nodes can be assigned carriers, e.g., according to assignment information in the overlaid communication start beacon 522, so that the coordinator node can organize which nodes will compete with each other for a given carrier. Taken to the extreme, only one node might be assigned to a carrier. This ensures that the node will always find the carrier available when it listens before talking, and allows the delivery of packets to and from that node without delay or collisions so that multimedia traffic can be delivered with good quality of service.

In a non-overlaid CSMA implementation, the non-overlaid communication start beacon 512 (and possibly the end beacon 516) includes information about the number of time slots, the length of each time slot, and which nodes are to use each time slot for uplink or downlink messages. Here, the definition of slot lengths and slot boundary times in the beacons can increase the efficiency of the network. This is because slotted CSMA networks suffer fewer collisions than CSMA networks with arbitrary packet start times.

Figure 8:
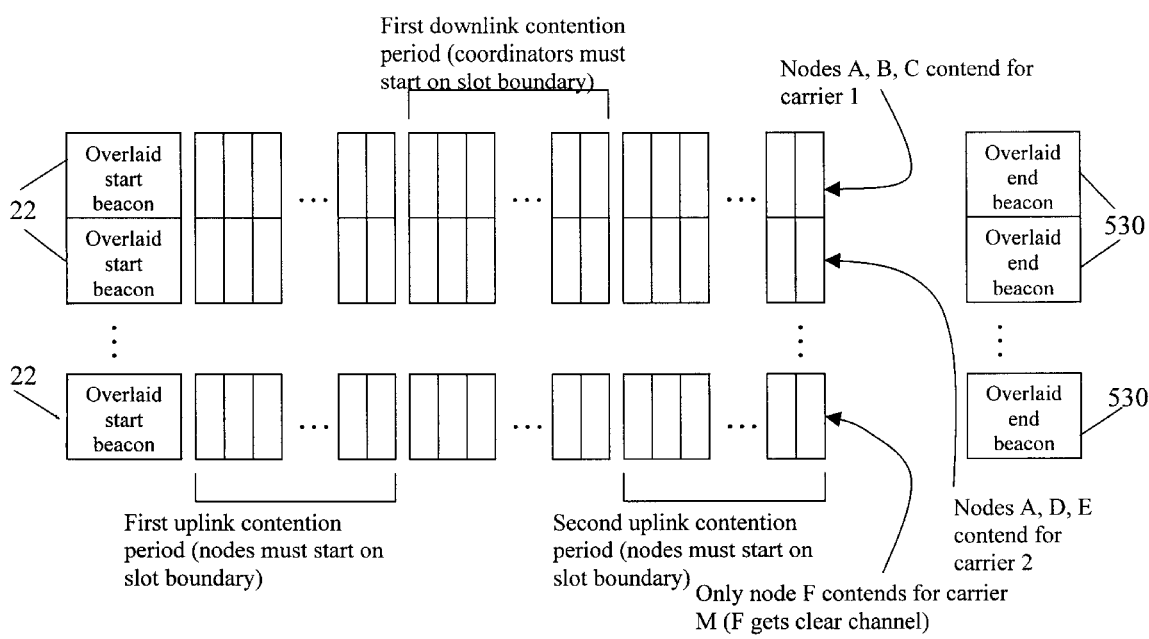
FIG. 8 is a timing chart of CSMA communication according to a preferred embodiment of the present invention.

FIG. 8 shows overlaid CSMA communication in another preferred embodiment of the present invention. Here, uplink and downlink portions 532 and 534 are established within the overlaid data communication period 524 according to slot boundaries. These slot periods are preferably quite short—shorter than a minimum packet length. This allows for a large number of slots in which a node may randomly choose to begin, reducing the chance of collision. In this example, three nodes a, b and c may contend for use of the first carrier 526, while nodes a, d and e contend for use of the second and only node f (perhaps the coordinator node) contends for use of the last carrier 526, i.e., it gets a clear channel.

To reduce the chances of collisions, nodes access each channel 526 using a listen-before-talking algorithm with random backoffs when a carrier 526 is busy. Also, by forcing all communications to start at a slot boundary accurate to a fraction of a symbol time, it is possible to ensure that timing parameters as discussed above are maintained. Additionally, by segmenting the overlaid data communication period 524 into uplink and downlink periods the system can prevent nodes and coordinator nodes from needing to transmit and receive simultaneously.

Generally speaking, CSMA cannot provide the highest quality of service since nothing insures that a given node can get access to a channel on a regular basis. Additionally, some packets may be destroyed by collisions. These problems can be reduced by giving nodes priority percolating up through any queues within a given node, as well as by giving them priority in gaining access to the medium. For example, nodes with low priority might be assigned to randomly wait between 10 and 20 slots from the beginning of the period before transmitting, while nodes with high priority might randomly choose a slot between 0 and 10 after the beginning of the period. In this manner, high priority traffic is more likely to get onto the network, and once on, other nodes will defer until its message is completed. In order to maintain time alignment among overlaid signals, any access priority must still constrain packets to begin at a slot boundary. The slot boundaries themselves must be defined and maintained with accuracy less than a symbol period in order to insure arrival of simultaneous overlaid transmissions with time aligned symbol transitions.

Polling is another method of media access control that could be applied to either the non-overlaid communication period or to the overlaid communication period. Polling is a method to coordinate the transmission of information in which the coordinator node invites other nodes to transmit by sending them a poll message. Polling can be a good approach because it gives the coordinator node a large degree of control. In addition, the other nodes need very little intelligence or time keeping to merely respond to the poll messages.

In order to make polling effective in providing quality of service, the coordinator node needs to be able to limit the length of response that will come from a given node. This allows the coordinator node to guarantee the timing of issuing polls to other nodes.

Figure 9:
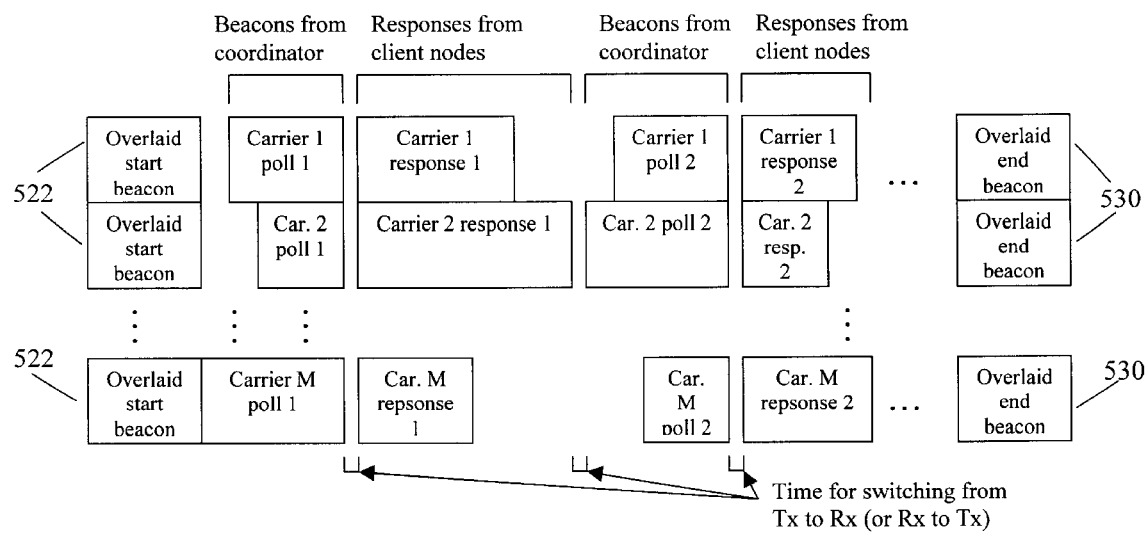
FIG. 9 is a timing chart of a polling operation in another preferred embodiment of the present invention.

Polling can be used in the overlaid communication period 520 or in the non-overlaid communication period 510. FIG. 9 shows a diagram of the use of polls during the overlaid communication period 520 on multiple carriers at once in another preferred embodiment of the present invention. FIG.

9 also shows an enhancement where beginnings of polling messages on different carriers are timed so that they end at the same time. Assuming all the nodes begin their responses to the poll messages a fixed amount of time after the end of their respective poll message, the responses to the poll messages will all be time-aligned. This technique is important in the case that the original poll messages (which may carry data to the nodes as well) are of different length.

In a polling system, the coordinator node can transmit a special service request poll that invites nodes that need to request service to respond. Since more than one node may need to request service at the same time, the service request poll might specify a contention window during which nodes can register. The nodes would then choose a random time—potentially aligned with a slot boundary—and listen before talking to reduce the chance of collision while registering. A further enhancement would be to have multiple service request polls that invite service requests for only a subset of the nodes or types of services at a given time. This could prioritize service requests and further reduce the odds of collisions.

New nodes entering a network, or existing nodes that would like to begin a new session of multimedia traffic, need to make a requested for service to the coordinator node. This is especially preferable in systems implementing TDMA or polling, since the coordinator node needs to poll the new node or allocate a TDMA slot to it. In overlaid operation, for any method of media access the coordinator node needs to assign the new node to a set of carrier frequencies.

If available carrier frequencies, slot times or both are indicated in a beacon, a node can transmit a request for service in one of the vacant carrier/time slots. If a node observes a variety of a carrier/time slots that are available for service registration, it should randomly choose which one to use.

Because of the difficulty in reliably transmitting data in some domains, it is necessary to check that a given packet was properly received and, if not, retransmit that packet. One method for doing this is to have the receiver send an acknowledgement back to the transmitter after each correctly received packet. If an acknowledgement does not appear, the original transmitting node can assume the packet was not successfully transmitted, and knows to retransmit it. While this system is workable, it can be fairly inefficient to send an acknowledgement after every packet. Efficiency of the network can be improved if acknowledgements are grouped, i.e., a single acknowledgement is sent after several packets. This grouped acknowledgement can report which of the preceding packets were correctly received, and which were lost and should be sent again.

In the polling systems described above, the acknowledgement for the poll message can be combined into the response to the poll message. Similarly, the acknowledgement of the response can be combined into the next poll message that the coordinator node sends to that particular node.

In a TDMA system in which it is known which time slot 528 a node should be using, a negative acknowledgement scheme can be used. In this type of system, acknowledgements are not generally sent. However, if the coordinator node or another node fails to find or properly receive a message in a time slot 528 that it believes should have had data in it, it can request a retransmission in the next packet it sends to the relevant node.

Frequency Control

As mentioned previously, in order for base station 400 to properly receive all of the signals simultaneously, the separate transmitting nodes must transmit their signals with very well matched sub-channel frequencies. In an OFDM system based on the IEEE 802.11 standard, for example, the sub-channels must be spaced apart by ~300 kHz. Thus, on a 5 GHz carrier, an inaccuracy of 60 parts per million would cause a sub-channel to be transmitted into the adjacent sub-channel, making it impossible to receive either signal.

To reduce this possibility, several techniques are available. For example, the system may use very accurate reference frequency crystals to insure that the frequency accuracy of transmissions is much better than 60 ppm. Alternatively, the system may ensure that each of the nodes 100–300 maintains its frequency using a GPS receiver that receives a very accurate frequency reference from a GPS satellite and locks transmissions to that reference frequency. The base station 400, too, may lock its transmission frequency to that of the GPS satellite.

Frequency control may be implemented by allowing the base station 400 to feed back information to the node in the form of a command signal, adjusting the transmit frequency in a closed loop fashion. For this, the coordinator node may have a frequency reference, or may observe a difference in frequency between nodes due to, e.g., a Doppler shift in moving nodes. This signal may be conveyed in data/command packets or, in the frame protocol of FIG. 6, in one or more beacons. Frequency control in the system also may be accomplished by locking all the transmission frequencies in the nodes 100–300 to the frequencies transmitted by the base station 400. This frequency might not be correct in absolute terms; however, as long as all nodes lock their carrier to this reference the frequency spacings of all carriers will be correct. It is the relative carrier frequency spacings, not the absolute carrier frequencies, which must be accurate in order for multi-carrier communication systems to work.

Timing Control

In addition to the above-described frequency considerations, a second area of concern is that in order to efficiently process all the received signals in the same FFT-based receiver in base station 400, all signals must arrive at the base station 400 with fairly well-aligned symbol transitions. Specifically, all signals from nodes 100–300 must arrive time-aligned within the guard time allocated for multi-path echoes in the environment. In typical indoor environments, this is ~100 ns.

Symbol transition alignment can be implemented using techniques akin to those described above for establishing strict frequency control. For example, a GPS unit may be used to give each node 100–300 (as well as base station 400) a very accurate absolute time reference. This time information is then used in each node 100–300 to adjust the time of transmitting a data packet therefrom such that it arrives at the base station 400 well time-aligned relative to all the other signals.

The system also may implement timing control by causing the base station 400 to send commands adjusting packet transmit timing to each of the nodes 100–300 and the nodes 100–300 adjust their timing in a closed-loop fashion. Such commands may be conveyed in data/command packets; in the frame protocol shown in FIG. 6, these may be instead be conveyed in one or more beacons. Alternatively, when the system is intended to operate over relatively short ranges, nodes 100–300 may get their timing entirely from the arrival of signals from the base station 400, since the maximum "flight" time differences between nodes 100–300 will not be large.

Another technique useful with short range systems, or systems in which all nodes are equally spaced from the coordinator node, is for each node to begin its transmission a fixed time period after the end of a packet from the coordinator node. This technique can provide time alignment of overlaid signals at the coordinator node.

In the framed protocol embodiment shown in FIG. 6, it is useful if all nodes contain a common master time reference to which all nodes can periodically lock their local clocks. This is useful for time-aligning transmissions and the transitions between different periods in the frame 500 by setting all nodes to begin their transmissions based on the master time reference. It is also useful for the delivery and reconstruction of multimedia data streams.

Power Control

In a third operational consideration, all signals transmitted from nodes 100–300 preferably arrive at the base station 400 with similar power levels. This is because a signal that is much too strong would swamp the ADCs in the base station 400, while a signal transmitted from one of nodes 100–300 that is much too weak would be lost in the noise from the other channels and not reliably received by the base station 400.

Similar to the above closed-loop control techniques, the system may use the base station 400 to send (via packets or beacons) signals to nodes 100–300 which indicate whether each node. 100–300 should transmit with more or less power. The system may alternatively implement open-loop control by having each node 100–300 adjust its power based on the power level it is receiving from the base station 400.

It should be noted that the above difficulties do not typically occur when a single base station transmits to all other nodes simultaneously. Because all signals are emanating from the same source, it is easy to insure that frequency sub-channels do not overlap, that all-signals have their symbol transitions at the same time, and that the power level of all sub-channels is the same as transmitted and therefore as received. However, it is possible for the base station to vary its allocation of transmit power amongst the various nodes to enhance efficiency.

The present invention has been described above in connection with preferred embodiments thereof; however, this has been done for purposes of illustration only,arid the invention is not so limited. Indeed, variations of the invention will be readily apparent to those skilled in the art and also fall within the scope of the invention. For example, although preferred embodiments of the present invention are implemented using a wireless communication medium, it will be readily apparent to those skilled in the art that it may be applied to a number of other communication media with similar benefits. Such variations also fall within the scope of the claims appended hereto.

What is claimed is:

1. A communication system comprising:

a first node for receiving a first signal;

a plurality of second nodes for receiving a second signal; and a coordinator node for alternately transmitting in a first mode and in a second mode, wherein:

the first mode generates the first signal having a first plurality of non-overlapping sub-channels conveying information, the first plurality of non-overlapping sub-channels collectively corresponding to the first node to receive the first signal, the second mode generates the second signal representative of a second plurality of non-overlapping sub-channels conveying information, and a plurality of groups of one or more sub-channels of the second plurality of non-overlapping sub-channels, each group corresponding to one of the plurality of second nodes to receive the second signal, and the plurality of second nodes simultaneously receives and processes the second signal, wherein processing the second signal generates, for each information-conveying group of one or more sub-channels corresponding to the one of the plurality of second nodes, a data stream representative of the information conveyed thereby.

2. The system of claim 1, wherein the coordinator node is for separating the first and second signals by at least one beacon.

3. The system of claim 2, wherein:

the coordinator node is for transmitting a first mode start beacon prior to transmitting the first signal and a first mode end beacon after transmitting the first signal; and the coordinator node is for transmitting a second mode start beacon prior to transmitting the second signal and a second mode end beacon after transmitting the second signal.

* * * * *